Patented June 29, 1954

UNITED STATES PATENT OFFICE 2,682,477

GLYCOL AND POLYPENTAERYTHRITOL COMPOSITION

Jesse B. Bronstein, Allentown, Pa., assignor to Trojan Powder Company, a corporation of New York No Drawing. Application May 4, 1951, Serial No. 224,653

7 Claims. (Cl. 106—36)

This invention relates to a glycol and polypentaerythritol composition and the method of making it. The invention relates particularly to such a composition that is solid and non-leaking at ordinary temperatures and that, when ground and exposed to air, quickly absorbs the equilibrium proportion of moisture.

When it is attempted to form a shippable mixture of a glycol with a polypentaerythritol, even in ground form, there results only a wetting of the solid particles of the polypentaerythritol. The glycol when used in large quantity drains from the remaining wet solid material on standing. Fusing together a polypentaerythritol and most glycols and then cooling the resulting mixture to room temperatures gives the same type of wet solid material.

I have discovered, however, that heating and then cooling a mixture of the polypentaerythritol and either ethylene or diethylene glycol produces a product entirely different from that obtained by simple mixing of the two ingredients at the same final temperatures. By the process of heating and subsequently cooling, I obtain a dry solid product in which the two components are so bonded or associated that the normally liquid glycol is not released on standing at room temperature even though the proportion of the glycol may be as high as 30% of the total. I have discovered also that of the common glycols, only ethylene glycol and diethylene glycol give this unexpected and beneficial result.

The invention is particularly useful in making a water soluble wax-like material and a friction dressing for power belts, to increase the drag of the belt on a pulley or other member over which the belt moves.

Briefly stated, the invention comprises the method of and the composition resulting from heating ethylene or diethylene glycol with a polypentaerythritol in amount in excess of that of the glycol to a temperature of at least 195° C., continuing the heating until the entire mass becomes a homogeneous fluid, and then cooling the product to room temperature. In one embodiment the invention comprises esterifying the resulting product with higher fatty acids.

As to materials used, I know of no glycols satisfactory for my purpose other than ethylene glycol and diethylene glycol.

The polypentaerythritol used is one containing 2 to 5 pentaerythritol units per molecule. Thus, I may use what may be called di-, tri-, tetra- or pentapentaerythritol. These are the products formed by condensation of 1, 2, 3, 4, or 5 units, respectively, of pentaerythritol, $C(CH_2OH)_4$, to give a poly compound. There is no advantage known to me in using the higher poly compounds such as the hexa- or heptapentaerythritol.

As fatty acids to be esterified with my glycol and pentaerythritol (PE) composition, I may use any higher ($C_{12}$ to $C_{18}$) fatty acid or mixtures of them. Examples are oleic, linoleic, linolenic, stearic, or palmitic acid or the fatty acids of paint oils such as linseed, soyabean, cottonseed, oiticica, or corn oil.

As to proportions, I use 10 to 30 parts of the glycol to 70 to 90 parts of the polypentaerythritol to make a composition that, after heating and cooling, will be non-leaking at ordinary or slightly elevated temperatures, proportions here and elsewhere herein being expressed as parts by weight unless otherwise stated.

In compounding the selected glycol and polypentaerythritol, I mix the materials in the predetermined proportion and heat the mixture to a temperature of at least 195° C. and until the whole mixture is completely melted, to give a homogeneous mass. If the batch is large or if both the materials are supplied in heated liquid form, then agitation is employed to insure the necessary uniformity and contact of the two materials at the elevated temperature. The composition so made in the hot condition is then cooled.

The cooled product is a solid in which either the ingredients are feebly or otherwise bonded or the polypentaerythritol serves as a skeletonizing agent for the whole composition. It is a non-bleeding solid that may be handled as a solid without fear of dripping of glycol from the solid. The composition is homogeneous, that is, appears to the eye to be the same in all parts.

As a wax, my product is substituted on an equal weight basis for water soluble waxes, carboxymethyl cellulose, and other thickening agents in various industrial compositions.

As a friction material, the solid composition is applied to the surface of a power belt or the like as by holding a block of the composition against the surface of the moving belt. When so applied, the composition leaves a deposit on the belt which increases the friction on the pulley or other part over which the treated surface of the belt moves.

The composition made as described and consisting of the glycol and polypentaerythritol is particularly useful in the making of esters of mixed glycol and polypentaerythritol. My composition mixed with the higher fatty acids disperses quickly in them without dusting during handling and without caking on the sides of the heated equipment. When the whole is then heated with fatty acids, either with or without a conventional catalyst of esterification, there are obtained esters with less discoloration than results when the polypentaerythritol for example is used alone without being compounded in advance with the glycol.

The invention will be further illustrated by description in connection with the following specific examples of the practice of it.

Example 1

A mixture of 20 parts of ethylene glycol and 80 parts of commercial dipentaerythritol (Di-PE) were placed in a vessel fitted with a condenser and provided with a heater. The temperature was raised gradually to 195°–200° C. and maintained at about 200°–210° C. until there resulted a clear fused mixture of the two materials. This clear fused mixture was then poured into aluminum dishes and allowed to cool. It solidified.

The melting point of this solidified mixture was found by test to be 207.5% C.

A portion of this material was carefully weighed and placed upon absorbent material in a desiccator which was kept at room temperature. After a period of 72 hours there was no sign of the ethylene glycol having exuded from the fused mixture. The loss in weight of the cake was only 0.57%.

Example 2

The procedure of Example 1 is repeated except that the proportion of the materials used is 30 parts of ethylene glycol for 70 of the Di-PE.

Example 3

The procedure of Examples 1 or 2 is followed except that tri-PE, tetra-PE, and penta-PE are substituted in turn and in equal proportions by weight for the Di-PE of Examples 1 and 2.

Example 4

The ethylene glycol of Examples 1 and 2 is replaced by an equal weight of diethylene glycol.

Products made as described in Examples 1–4 are solid when cooled to room temperature and show no seeping out or leakage of the glycol. When exposed in comminuted form to air, they absorb moisture and come to equilibrium relatively quickly.

Example 5—Esterification 56 parts of a fused mixture of 30 parts ethylene glycol and 70 parts commercial Di-PE are mixed with 400 parts of soya oil fatty acids. The mixture was stirred and heated to 250° C., at a rate of 5° temperature rise per minute. After a period of 1 hour the reaction mixture was tested and found to have an acid number of 21.8 and a viscosity of B–C (Gardner). The heating was continued for 12 hours and the esters then showed an acid number of 6.2 and a viscosity of E (Gardner). The esters were light in color.

Example 6—Esterification

The procedure of Example 5 is followed except that the product of Example 1 used as a raw material in that example is substituted in turn and on an equal weight basis by each of the products of Examples 2, 3, and 4.

As to the rate of absorption of water by representative glycol and poly-PE compositions, the following data are significant.

| | Moisture Taken up in Air at 70% Relative Humidity and Room Temperature | | |
|---|---|---|---|
| | 24 Hrs. | 48 Hrs. | 72 Hrs. |
| Example 1 product: 20 parts ethylene glycol—80 parts DiPE (pulverized) | Percent 9.4 | Percent 9.2 | Percent 8.7 |
| Example 3 product: 30 parts ethylene glycol—70 parts DiPE (pulverized) | 13.3 | 13.9 | 13.8 |

The quickness of absorption by my fused and then ground mass will be appreciated by comparison with the behavior of ethylene glycol alone. Exposed to moist air, the glycol does not come to the equilibrium weight in 7 days, in fact, it absorbs as much water in the second week as the first week (Beilstein, vol, 1, p. 465). My mass, by contrast, comes to approximate equilibrium in 1 day or less.

It will be understood that it is intended to cover all changes and modifications of the examples of the invention herein chosen for the purpose of illustration which do not constitute departures from the spirit and scope of the invention.

What I claim is:

1. A composition of matter comprising a glycol selected from the group consisting of ethylene glycol and diethylene glycol and a polypentaerythritol containing 2 to 5 pentaerythritol units to the molecule, the proportion of the glycol being 10 to 30 parts for 70 to 90 of the polypentaerythritol and the composition being a dry solid that does not release glycol at room temperature.

2. A homogeneous solid composition consisting essentially of 10 to 30 parts of ethylene glycol and 70 to 90 parts of dipentaerythritol for 100 parts of the said composition.

3. A dressing for increasing friction of the surface of power belts and the like, the dressing consisting essentially of the composition described in claim 1.

4. A wax consisting essentially of a solid homogeneous combination of a glycol selected from the group consisting of ethylene glycol and diethylene glycol and a compound selected from the group consisting of polypentaerythritols containing 2 to 5 pentaerythritol units to the molecule.

5. The method of making a dry solid fusion product which comprises forming a mixture of a glycol selected from the group consisting of ethylene glycol and diethylene glycol and a polypentaerythritol containing 2 to 5 pentaerythritol units to the molecule, in the proportion of 10 to 30 parts of the selected glycol, for 70 to 90 of the polypentaerythritol, heating the mixture at a temperature of at least about 195° C. and maintaining this temperature until the mass becomes homogeneous, and then cooling the resulting liquid until it solidifies.

6. A composition of matter comprising the higher fatty acid esters of the composition of claim 1.

7. The method of making a dry solid fusion product which comprises forming a mixture of a glycol selected from the group consisting of ethylene glycol and diethylene glycol and a polypentaerythritol containing 2 to 5 pentaerythritol units to the molecule, in the proportion of 10 to 30 parts of the selected glycol, for 70 to 90 parts of the polypentaerythritol, heating the mixture at a temperature of at least about 195° C., maintaining this temperature until the mass becomes homogeneous, cooling the liquid until it solidifies and esterifying the resulting solid with a higher fatty acid having from 12 to 18 carbon atoms in each molecule.

References Cited in the file of this patent

UNITED STATES PATENTS

| Number | Name | Date |
|---|---|---|
| 2,156,828 | Wolfe et al. | May 2, 1939 |
| 2,450,079 | Brown | Sept. 28, 1948 |
| 2,464,632 | Bennett el al. | Mar. 15, 1949 |